US008432928B2

(12) United States Patent
Yanagihara

(10) Patent No.: US 8,432,928 B2
(45) Date of Patent: Apr. 30, 2013

(54) HANDOVER CONTROL BETWEEN BASE STATIONS IN A MULTI-HOP MOBILE COMMUNICATION NETWORK

(75) Inventor: Kentarou Yanagihara, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 1521 days.

(21) Appl. No.: 11/798,897

(22) Filed: May 17, 2007

(65) Prior Publication Data

US 2007/0270149 A1    Nov. 22, 2007

(30) Foreign Application Priority Data

May 19, 2006  (JP) ................................ 2006-139942

(51) Int. Cl.
*H04W 36/00* (2009.01)
(52) U.S. Cl.
USPC ........... 370/436; 455/437; 455/439; 455/442; 455/443; 370/331
(58) Field of Classification Search .................. 455/436, 455/437, 439, 442, 443; 370/331
See application file for complete search history.

(56) References Cited

U.S. PATENT DOCUMENTS

| 5,241,685 A * | 8/1993 | Bodin et al. ................. 455/453 |
| 5,408,514 A * | 4/1995 | Sakamoto et al. ............ 455/436 |
| 6,463,285 B1 * | 10/2002 | Davies et al. ................. 455/436 |
| 6,904,024 B1 * | 6/2005 | Boch et al. ................. 370/310.1 |
| 7,505,744 B1 * | 3/2009 | Shan ............................. 455/130 |
| 2001/0018346 A1 * | 8/2001 | Okajima et al. .............. 455/437 |
| 2002/0082017 A1 | 6/2002 | Hattori |
| 2005/0014515 A1 * | 1/2005 | Suzuki ........................ 455/456.1 |
| 2005/0096051 A1 * | 5/2005 | Lee et al. ...................... 455/438 |
| 2006/0280226 A1 * | 12/2006 | Krasner ......................... 375/130 |
| 2007/0110005 A1 * | 5/2007 | Jin et al. ........................ 370/335 |
| 2007/0111730 A1 * | 5/2007 | Baker et al. .................... 455/436 |

FOREIGN PATENT DOCUMENTS

JP    2000-102057    4/2000

* cited by examiner

*Primary Examiner* — Kamran Afshar
*Assistant Examiner* — Khalid Shaheed
(74) *Attorney, Agent, or Firm* — Rabin & Berdo, P.C.

(57) ABSTRACT

A handover control method carried out at a mobile station for switching a destination base station in a multi-hop network includes a reception step of receiving a communication signal and information of neighboring base stations used to identify a base station existing in the surrounding area of the base station transmitted from the base station, and a control step of controlling handover on the basis of the signal and information thus received. The control step includes a present destination decision step of deciding the base station currently connected, a switching decision step of using the information of neighboring base stations to decide whether or not the base station to be connected is to be switched over, and a switching step of switching over the base station to be connected on the basis of the decision result of the switching decision step. Thus unnecessary handover operations can be reduced.

24 Claims, 13 Drawing Sheets

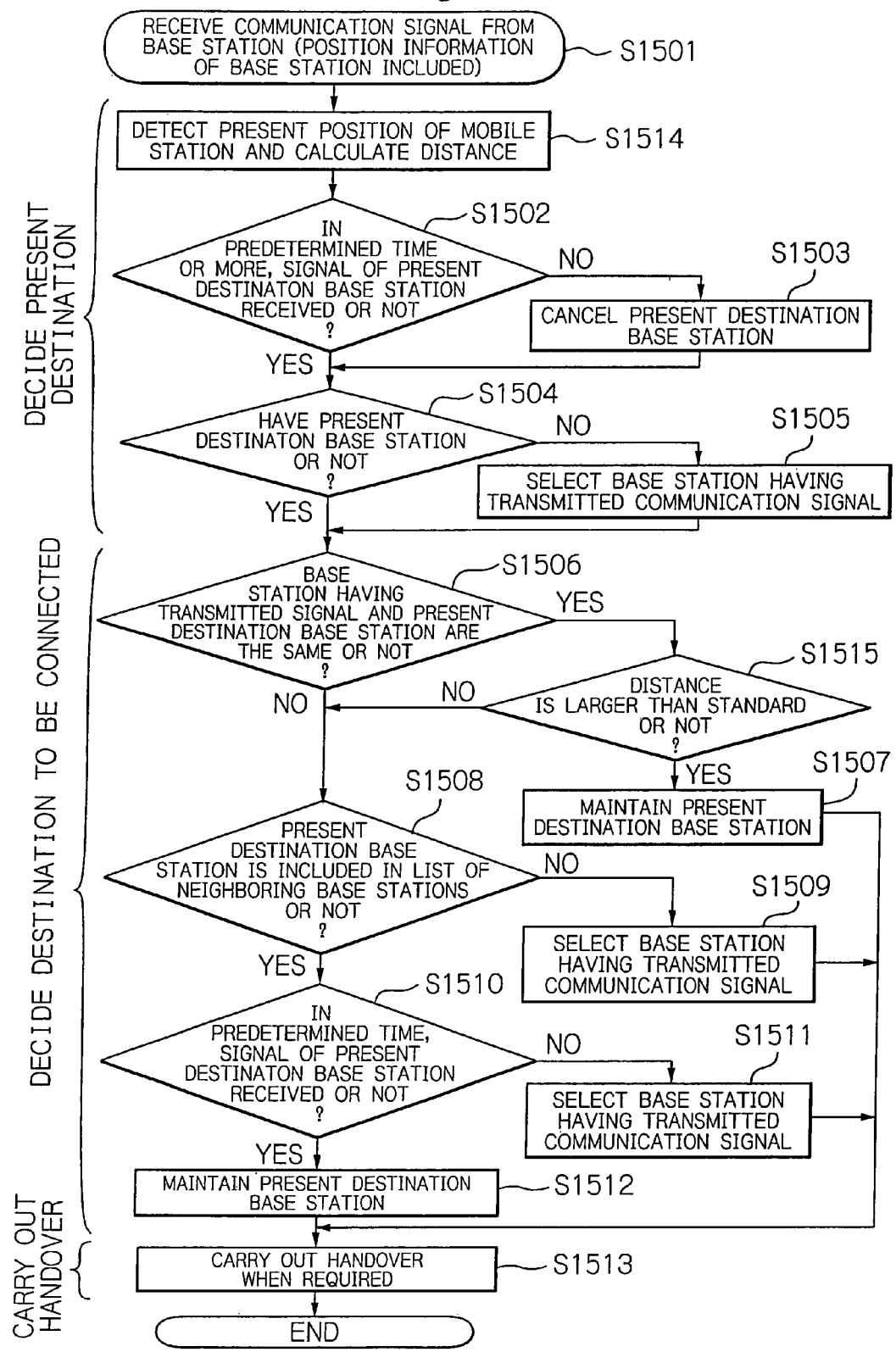

HANDOVER CONTROL BETWEEN BASE STATIONS IN A MULTI-HOP MOBILE COMMUNICATION NETWORK

BACKGROUND OF THE INVENTION

1. Field of the Invention

The present invention relates to handover control in a multiple-hop mobile communication network, and more specifically to a method for selecting a base station to directly communicate with while a mobile terminal is moving in a multiple-hop wireless communication network such as a wireless sensor network. The present invention also relates to a mobile communication terminal and a base station for use in such a method.

2. Description of the Background Art

Conventionally, in a mobile communication system, so-called handover operation is done to change a base station to be connected when a mobile terminal moves while communicating. Generally, in handover operation, a mobile communication terminal selects and changes a base station to be connected on the basis of the strength and reception quality of electromagnetic waves received from plural neighboring base stations. As such handover technology, several methods are proposed, which will be described below.

In a handover method on the basis of the reception level disclosed in the Japanese patent laid-open publication No. 2000-102057, the idle handover control process classifies the reception qualities of a pilot channel for establishing synchronization into quality class 1 which is able to receive data without error, quality class 2 which is able to receive data with tolerable error and quality class 3 which is difficult to receive data with good quality, with decision values of 6 db, 4 db and 2 db allotted, respectively. Then, it is decided whether or not the reception quality of the pilot channel with which synchronization is presently established is lower than the reception quality of another pilot channel that is an alternative with which synchronization maybe established with a decision reference value set in a classified quality class of the pilot channel with which synchronization is present established. Only if the other pilot channel is higher in reception quality than the pilot channel with which synchronization is presently established, the handover operation is performed.

In the U.S. patent application publication No. 2002/008217 A1 to Hattori, a method is disclosed in which by obtaining the positional information of neighboring base stations by means of the Global Positioning System (GPS) and measuring the distances from a mobile terminal, the handover operation is performed to an appropriate base station. In a waiting status, on the basis of the GPS signal periodically received by a GPS receiver, the position information of the terminal is calculated by means of a position calculating function, and then on the basis of the position information of that terminal and the position information of the base station notified in the system information sent from the base station with which synchronization is presently established, the distance between the base station and the terminal is calculated by means of a distance calculating function. Further, the function of determining the necessity of handover compares the calculated distance with a threshold value notified from the base station. When the distance is larger than the threshold value, the handover from the current system to a different system is performed by a handover control function.

Another U.S. patent application publication No. 2005/0014515 A1 to Suzuki discloses a method into which the method taught by '057 Japanese patent publication with the method taught by Hattori. In Suzuki, a position information detector, a distance calculator and a moving direction and speed calculator obtain the distances between the mobile communication terminal and its plural neighboring base stations and the moving direction and speed of the mobile communication terminal, and further a transfer path quality detector obtains the degree of fading deterioration of respective neighboring base stations. Next, on the basis of the parameters thus obtained, an offset calculator calculates offset values to the received signal level of the respective neighboring base stations. Finally, on the basis of the calculated off set values and the received signal levels of plural neighboring base stations, a handover destination base station to which the communication is to be handed over is selected by means of a handover destination selector.

In these conventional handover control methods, the base station having the best communication condition is basically selected. In other words, the nearest base station is selected in order under a general circumstance. Because, these conventional handover control methods are principally applied to mobile telephone networks under the circumstances that communications are made via wired networks except communications between base stations and mobile terminals, and further that the distances between the base stations are set longer than the distance which radio waves are available.

However, in multi-hop wireless networks to which the present invention is applicable, direct wireless communications are required between neighboring base stations. Therefore, the distances between the base stations should be set shorter than the distance radio waves are available.

In such a case, since the distances between the base stations are short, the wireless signal emitted by the mobile station can reach to plural base stations. Therefore, even though a mobile station stays nearest to a current base station, the mobile station can communicate with other neighboring base stations.

Under these circumstances, the conventional handover control methods are used with the result that unnecessary handover occurs so often that problems arise such as increase in power consumption and wireless control signal. Moreover, wireless stations to which the invention is applicable are smaller in range where wireless signals are available than cellular phone systems, so that handovers tend to occur more frequently.

Besides, in case of cellular phone systems, since signals are transmitted almost all the time in a call, the level of received signals is always measured. By contrast, in case of mobile sensor networks, since the communication is not always made, handover control using reception signal levels requires base stations to frequently transmit reference signals for controlling the handover.

SUMMARY OF THE INVENTION

It is an object of the present invention to provide a handover control method that is able to reduce unnecessary handover operations, and a mobile communication terminal and a base station for use in such a method.

In accordance with the present invention, a handover control method carried out at a mobile terminal for switching a destination base station in a multi-hop network including base stations and mobile terminals in which distances between base stations are shorter than a range in which a wireless communication signal is available. The handover control method comprises a reception step of receiving a communication signal and information of neighboring base stations used to identify a base station existing in the surrounding area of a base station transmitted from the base station, and a control step of controlling handover processing on the basis of the signal and information received at the reception step. Further, the control step comprises a present destination decision step of deciding the base station connected with at present, a switching decision step of using the information of the neighboring base stations to decide whether or not the destination base station to be connected is to be switched over, and a switching step of switching over the destination base station to be connected on the basis of the decision result of the switching decision step.

With the handover control method according to the present invention, it is possible to reduce control information transmitted between base stations by reducing the frequency of handover operations, and also to reduce the amount of wireless communication signals and power consumption of a base station. Further, it is possible to reduce the amount of the control information sent from a mobile station and power consumption of the mobile station, thus significantly extending the hours of operation of the mobile station.

BRIEF DESCRIPTION OF THE DRAWINGS

The objects and features of the present invention will become more apparent from consideration of the following detailed description taken in conjunction with the accompanying drawings in which:

FIG. 15 is a flowchart that shows an algorithm of the handover decision on the basis of the distance to the base station.

DESCRIPTION OF THE PREFERRED EMBODIMENTS

Figure 1:
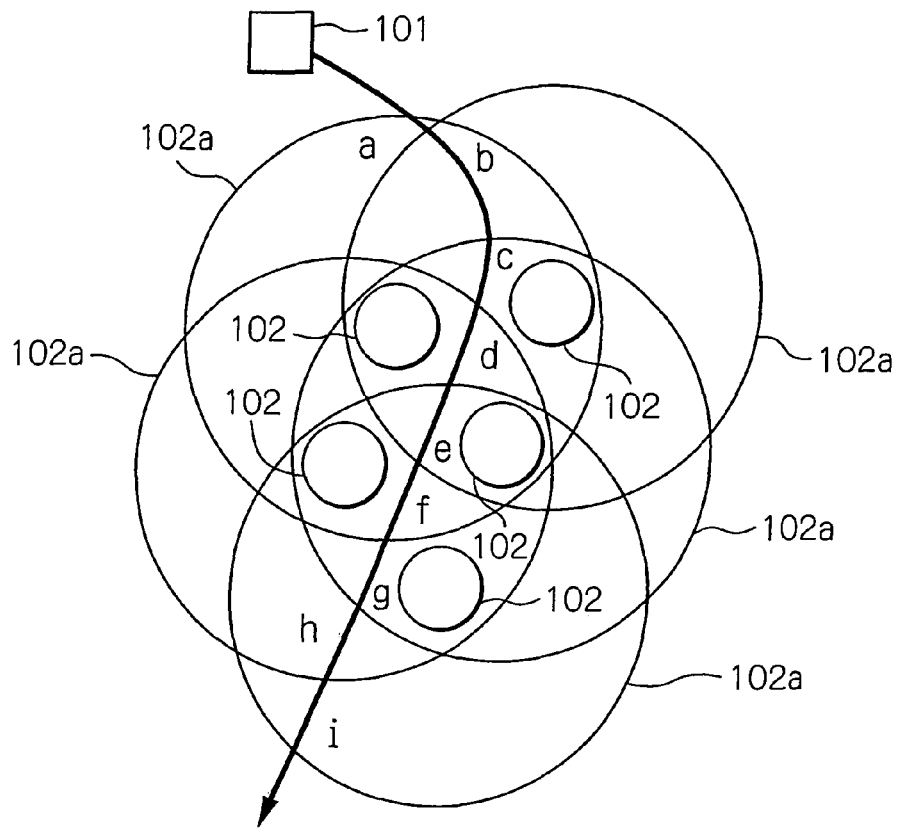
FIG. 1 is a schematic block diagram showing a specific configuration of a multi-hop wireless network of the first embodiment in accordance with the present invention.

With reference to FIG. 1, the multiple-hop wireless network of the first illustrative embodiment of the present invention will now be described in detail. The present invention is applicable to a wireless network which includes a lot of base stations distributed rather in dense. In the illustrative embodiment of the invention, the multi-hop wireless network includes a mobile station 101. The mobile station 101, which may be carried by a person or mounted on a vehicle, moves within an area in which plural base stations 102 are arranged. In FIG. 1, there are specifically five base stations #1 through #5. The base stations 102 are fixed and not moveable. The circles 102a in which the corresponding base stations 102 are centered show service areas in which the centered base station 102 can communicate. In the illustrative embodiment, the communication system only composed of the base stations 102 and the mobile stations 101, one of which is depicted, and the base stations 102 do not have wired communication facilities, so that intended communication between the mobile station 101 and its destination terminal is accomplished by repeating wireless communication between the base stations 102.

Figure 2:
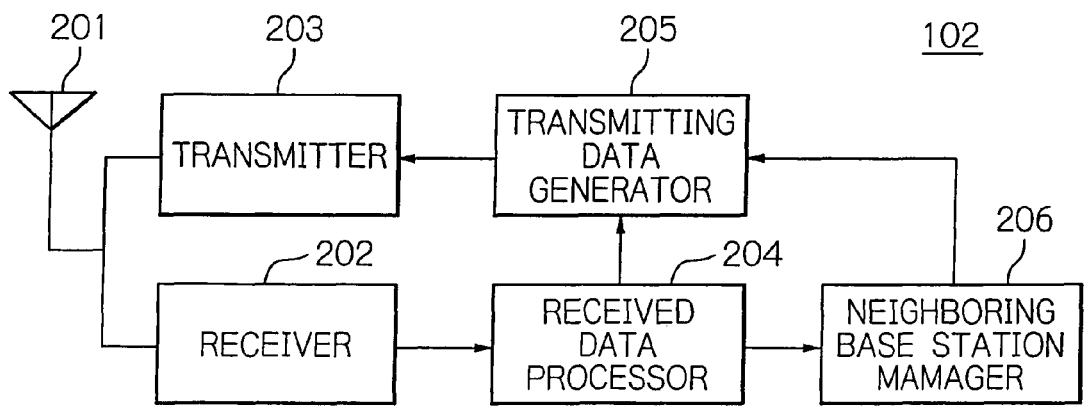
FIG. 2 shows a schematic block diagram of the base station shown in FIG. 1 according to the first embodiment.

With now reference to FIG. 2, the base station 102 of the illustrative embodiment will now be described in detail. The base station 102 is composed of an antenna 201, a receiver 202, a transmitter 203, a received data processor 204, a transmitting data generator 205 and a neighboring base station manager 206, which are interconnected as illustrated.

The antenna 201 adapted to transmit and receive radio wave signals outputs a received wireless signal to the receiver 202, and transmits a wireless signal supplied from the transmitter 203 in the form of radio waves. The receiver 202 is adapted to process the wireless signal supplied from the antenna 201 and convert it into a digital form of information as the received data, which is in turn outputted to the received data processor 204. The received data processor 204 is adapted to process the received data supplied from the receiver 202, and output the necessary data, after thus processed, to the neighboring base station manager 206. The transmitter 203 functions as converting the transmitting data generated by the transmitting data generator 205 into the wireless signal to output it to the antenna 201. The transmitting data generator 205 produces a handover signal including the code specific to a terminal and information of neighboring base stations obtained by the neighboring base station manager 206. The transmitting data generator 205 further functions as producing transmitting data to be sent to a mobile station, e.g. 101, now connected with that base station 102. The neighboring base station manager 206 serves as storing and managing identification codes of its neighboring base stations. Further detailed description will be made later with reference to FIG. 5. The antenna 201, receiver 202 and received data processor 204 form receiver means of a mobile communication terminal according to the invention.

Figure 3:
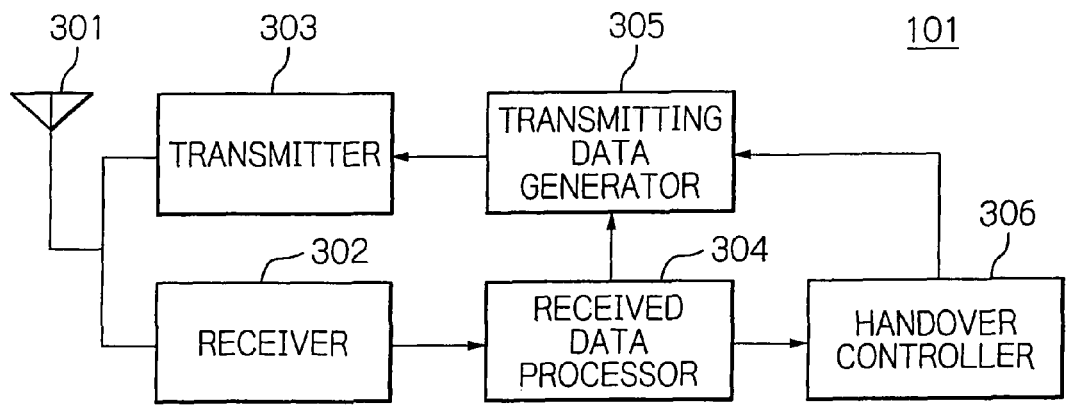
FIG. 3 shows a schematic block diagram of a mobile communication terminal shown in FIG. 1 according to the first embodiment.

With reference to FIG. 3, the mobile communication terminal of the illustrative embodiment will now be described in detail. The mobile station 101 is composed of an antenna 301, a receiver 302, a transmitter 303, a received data processor 304, a transmitting data generator 305 and a handover controller 306, which are interconnected as illustrated. The antenna 301 adapted to transmit and receive radio wave signals outputs the received wireless signal to the receiver 302, and transmits the wireless signal supplied from the transmitter 303. The receiver 302 serves as processing the wireless signal supplied from the antenna 301 and converting it into a digital type of information as the received data that is outputted to the received data processor 304. The received data processor 304 functions to process the received data supplied from the receiver 302 and output the necessary data, after thus processes, to the handover controller 306. The transmitter 303 serves to convert the transmitting data generated by the transmitting data generator 305 into the wireless signal and output it to the antenna 301. The transmitting data generator 305 is adapted to produce information required to connect or disconnect with the base station 102 on the basis of the decision of the handover controller 306. The transmitting data generator 305 also generates transmitting data to be sent to a base station 102 connected with. The operation of the handover controller 306 will be described later on with reference to FIGS. 5 to 10.

In operation, with reference to FIG. 4, the communication procedure between the base station 102 and the mobile station 101 shown in FIG. 1 will be described. As an example, the communication procedure will be described between a base station #1, another base station #2 and the mobile station 101 as shown in FIG. 1. The procedural steps therefore will read as follows.

At step S401, the transmitting data generator 205 of the base station #2 generates a wireless signal including own identification code and transmits it via the transmitter 203 and the antenna 201.

At step S402, at the base station #1, the antenna 201 receives the wireless signal transmitted from the base station #2 and outputs it to the receiver 202, the receiver 202 processes the wireless signal supplied from the antenna 201 and converts it into digital information as the received data that is outputted to the received data processor 204, and the received data processor 204 extracts up the identification code of the base station #2 from the received data and outputs it to the neighboring base station manager 206.

At step S403, in the base station #1, the neighboring base station manager 206 stores and manages the identification code of the base station #2 as the neighboring base station of the base station #1. Then, it is possible to decide that the base station is identified by the identification code being managed by the neighboring base station manager 206 as the neighboring station of the base station #1.

At step S404, in the base station #1, the transmitting data generator 205 produces transmitting data that includes in addition to an identification code specific to that base station an identification code of the neighboring base station being managed by the neighboring base station manager 206. The transmitting data thus produced by the transmitting data generator 205 is sent to the mobile station 101 via the transmitter 203 and the antenna 201.

At step S405, the antenna 301 of the mobile station #1 receives the wireless signal transmitted from the base station #1 and outputs it to the receiver 302. The receiver 302 in turn processes the wireless signal supplied from the antenna 301 and converts it into a digital form of information as the received data that is outputted to the received data processor 304.

At step S406, the received data processor 304 extracts the identification codes of the base station #1 and the base station #2 from the received data and outputs them to the handover controller 206.

At step S407, the handover controller 206 controls the handover under the prescribed algorithm. The details of the algorithm will be described later in FIG. 5 and so on.

As described above, each base station periodically transmits a wireless signal including its own identification code toward its neighboring base stations. After the base station 102 has received wireless signals from the neighboring base stations, the base station 102 sends out a wireless signal to the mobile station 101, the wireless signal including its own identification code as well as the identification codes of neighboring base stations 102, so that the mobile station 101 is able to decide to which base station it will hand over among the plural base stations 102 corresponding to these identification codes. For the sake of convenience, only two base stations #1 and #2 are shown in FIG. 4. However, similar transmission of the identification codes is carried out between all base stations existing within the communication range.

Next, when the handover control method according to the invention is carried out, how to decide the handover will be described on the basis of the places having letters a to i shown in FIG. 1. In FIG. 1, a thick arrow represents an exemplified moving path of the mobile station 101, and letters a to i are, for the sake of convenience, assigned to the sections in which the combination of an accessible base station with that mobile station 101 is maintained. In FIG. 1, the base station #1 connects with base stations #2, #3 and #4, the base station #2 connects with base stations #1 and #4, the base station #3 connects with the base stations #1, #4 and #5, the base station #4 connects with base stations #1, #2, #3 and #5, the base station #5 connects with base stations #3 and #4. Signals transmitted between the stations in advance allow necessary connection information described above to be included in the wireless signal transmitted from those base stations. For illustration, the interruption interval of signals transmitted from the respective base stations is sufficiently short with respect to the moving speed of the mobile station 101.

At the section a, when the mobile station 101 has received the signal transmitted from the base station #1, it connects with the base station #1. Then, at the sections b, c, d and e, the mobile station 101 receives the signal transmitted from the base station #2, and however, none of handover operation is carried out, because it already connects with the station #1. At the sections d, e, f and g, the mobile station 101 receives the signal transmitted from the base station #3, and however, none of handover operation is carried out, because the station #3 connects with the station #1. At the sections c, d, e, f and g, the mobile station 101 receives the signal transmitted from the base station #4, and however, none of handover operation is carried out, because the station #4 connects with the station #1. At the sections e, f, g, h and i, when the mobile station 101 receives the signal transmitted from the base station #5, it connects with the station #5 by its handover operation, because the station #5 does not connect with the station #1.

As a result, on the moving path shown in FIG. 1, the mobile station 101 carries out the handover operation to the base stations #1 and #5 successively. By means of a traditional method that does not use information of the neighboring base stations, the mobile station also carries out the handover operation to one or more of base stations #2, #3 and #4. The reason is that the distribution density of the base stations 102 in the traditional method is lower than the density in the multi-hop wireless network to which the present invention is applied.

In the multi-hop wireless network, around a base station 102, there is generally an area in which simultaneous communication is possible with two neighboring base stations apart from each other. For example in FIG. 1, around the base station #3, in the area f on the moving path, the communication with the base stations #1 and #5 is also possible. It is the essential object of the present invention to accomplish the handover control effectively by using information of the neighboring base stations and reduce the number of handover operations required in the area in which simultaneous communication with plural neighboring base stations is possible.

In operation, with reference to FIG. 5, an algorithm of the handover control carried out by the handover controller 306, at the step S407 shown in FIG. 4 will be described. Steps of the algorithm will proceed as follows.

At step S501, having received a communication signal from a base station in the form of wireless signal, the handover controller 306 starts its handover control. Simultaneously, it prepares the list of neighboring base stations on the basis of the identification code included in the communication signal before starting.

At step S502, the handover controller 306 decides whether or not it received the signals from its present destination base station during a predetermined period of time or more. When it decides that none of reception was made during the predetermined period of time or more, it goes to step S503. When it decides that reception was made within the predetermined time period, it goes to step S504. At step S503, the handover controller 306 cancels the present destination base station.

At step S504, the handover controller 306 decides whether or not it has the present destination base station. When it decides that it has no present destination base station, it goes to step S505. When it decides that it has the present destination base station, it goes to step S506. At step S505, the handover control controller 306 selects the base station that has transmitted the communication signal received at step S501.

At step S506, the handover controller 306 decides whether or not the base station that has transmitted the communication signal at step S501 is the same as the base station that is selected as its present destination. When it decides that both stations are the same as each other, it goes to step S507. When it decides that both are different from each other, it goes to step S508. At step S507, the handover controller 306 decides that it is unnecessary to change its present destination base station, and goes to step S513.

At step S508, the handover controller 306 decides whether or not the base station that is selected as its present destination is included in the list of neighboring base stations represented by the identification code included in the communication signal. When it decides that the base station selected as its present destination is not included, it goes to step S509, and when it decides included, it goes to step S510. At step S509, the handover controller 306 selects the base station that has transmitted the communication signal received at step S501.

At step S510, the handover controller 306 decides whether or not it has received the signals from its present destination base station within the predetermined time. When it decides that reception was made, it goes to step S512, and when it decides that none of reception was made, it goes to step S511. At step S511, the handover controller 306 selects the base station that has transmitted the communication signal received at step S501.

At step S512, the handover controller 306 decides that it is unnecessary to change its present destination base station, and goes to step S513. At step S513, on the basis of the decision results described above, when the handover controller 306 decides that it is necessary to change its present destination base station, it switches the destination base station by carrying out the handover operation.

In operation, with reference to FIG. 6, another algorithm of the handover control according to the illustrative embodiment of the invention will be described in which the reception level of the communication signal is used for the handover decision.

In the illustrative embodiment of the invention, it is possible to use the algorithm in which the identification code of the neighboring base station is used for the handover decision together with the other handover control algorithm. For example, the provision of the receiver 302 of the mobile station with the function of measuring the reception level of a received communication signal and the output of information thereon thus obtained to the handover controller 306 allows the handover controller 306 to use the reception level as a decision criterion in addition to the identification code of the neighboring base station. By obtaining the information of reception level, it is possible to know or determine approximately the distance between the base station 102 and the mobile station 101 for helping handover decision.

Figure 5:
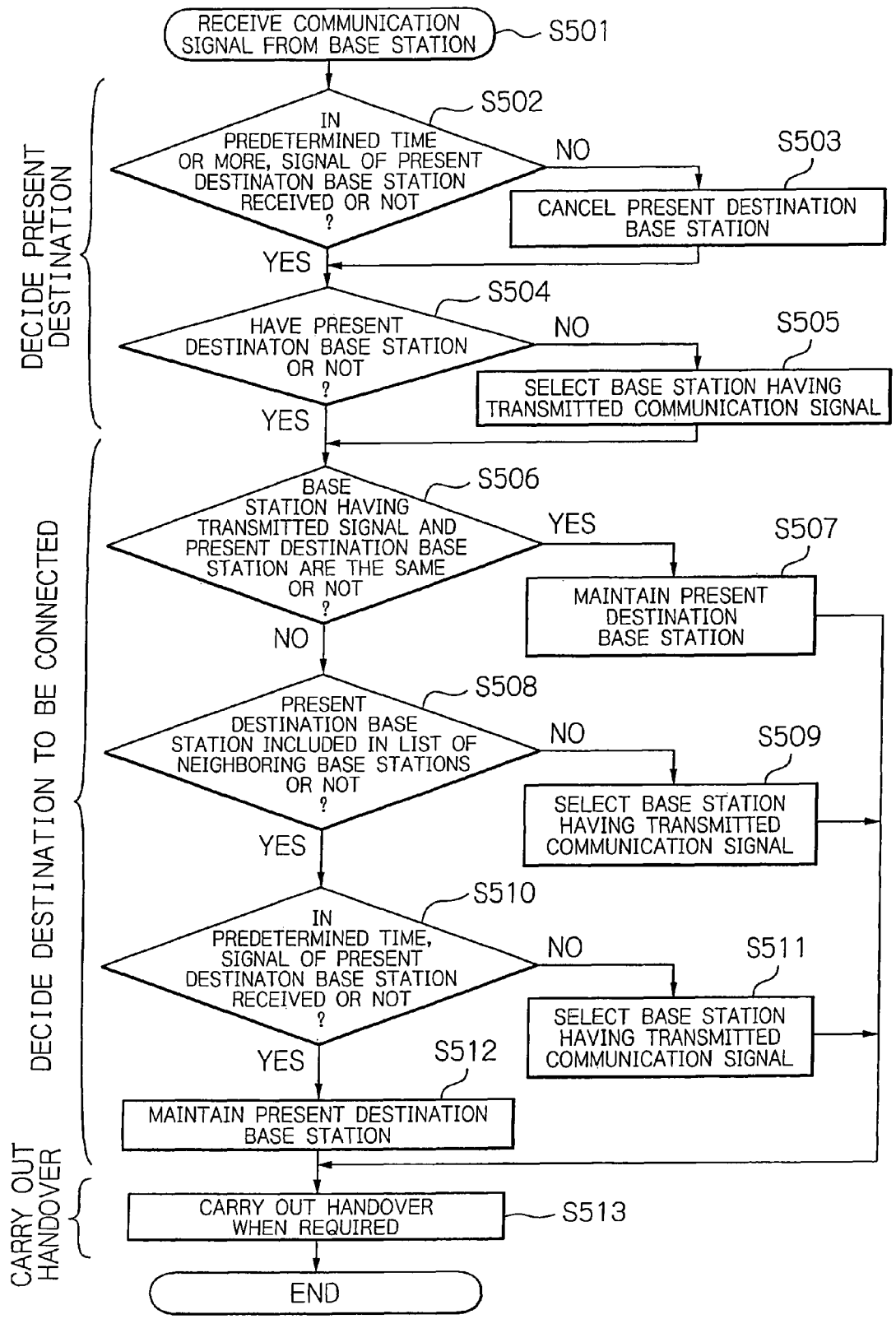
FIG. 5 is a flowchart that shows an algorithm for controlling a handover by the handover controller at the step of handover control shown in FIG. 4.
Figure 6:
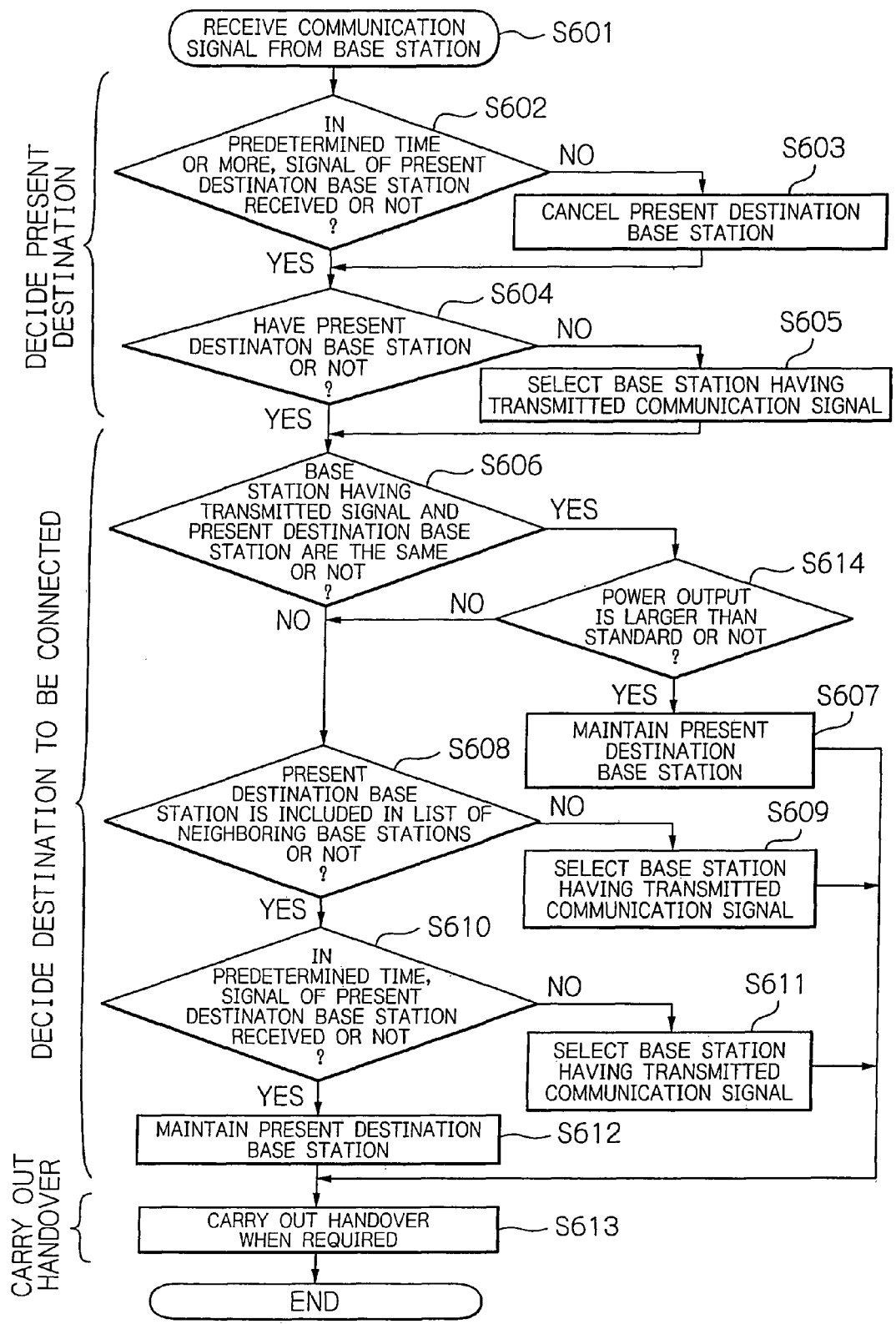
FIG. 6 is a flowchart that shows an algorithm of the handover decision on the basis of the reception level of the communication signal.

The algorithm of the handover control shown in FIG. 6 uses the reception level for the handover decision. Steps S601 to S613 are the same as steps S501 to S513 in FIG. 5. However, in step S606, when the handover controller 306 determines that the base station that has transmitted a communication signal is one and the same base station that is selected as its present destination, it goes to new step S614 prior to step S607.

At step S614, the handover controller 306 determines the reception level of the communication signal received at step S601. When the reception level is higher than the predetermined reference level, it goes to step S607, and otherwise goes to step S608.

Further, the provision of the handover controller 306 with the function of storing the history of measuring the reception level of the communication signal received in the past makes it possible to use the measurement history for the handover decision. In this case, it is also possible to know whether the mobile station 101 is approaching to each base station or is going away from them for helping handover decision. In this case, for example, step S614 may be as follows, although not specifically shown in the figure.

At step S614, the handover controller 306 decides whether or not the mobile station 101 is moving in the direction apart from the base station, on the basis of the measurement history of the reception level. When it decides that the mobile station is going away, it goes to step S608, and when approaching, it goes to step S607.

It is also possible to use the measured communication quality of the communication signal instead of, or together with, the reception level for the handover decision. In this case, at step 614, the communication quality is used instead of, or together with, the reception level for similar decision, as well as the measurement history.

In operation, with reference to FIG. 6, another algorithm of the handover control according to the illustrative embodiment of the invention will be described in which the output power information transmitted from the base station 102 is used for the handover decision.

The base station 102 not always transmits all of its transmitting signals with the same output power, but with variable output power depending upon the contents of data to be transmitted. In this case, by including the information of the output power used by the base station 102 in a communication signal, it is possible to determine the approximate distance between the mobile station 101 and the base station 102. For example, when the communication signal having weak output power cannot be received, the distance between the mobile station 101 and the base station 102 may be supposed far.

Figure 4:
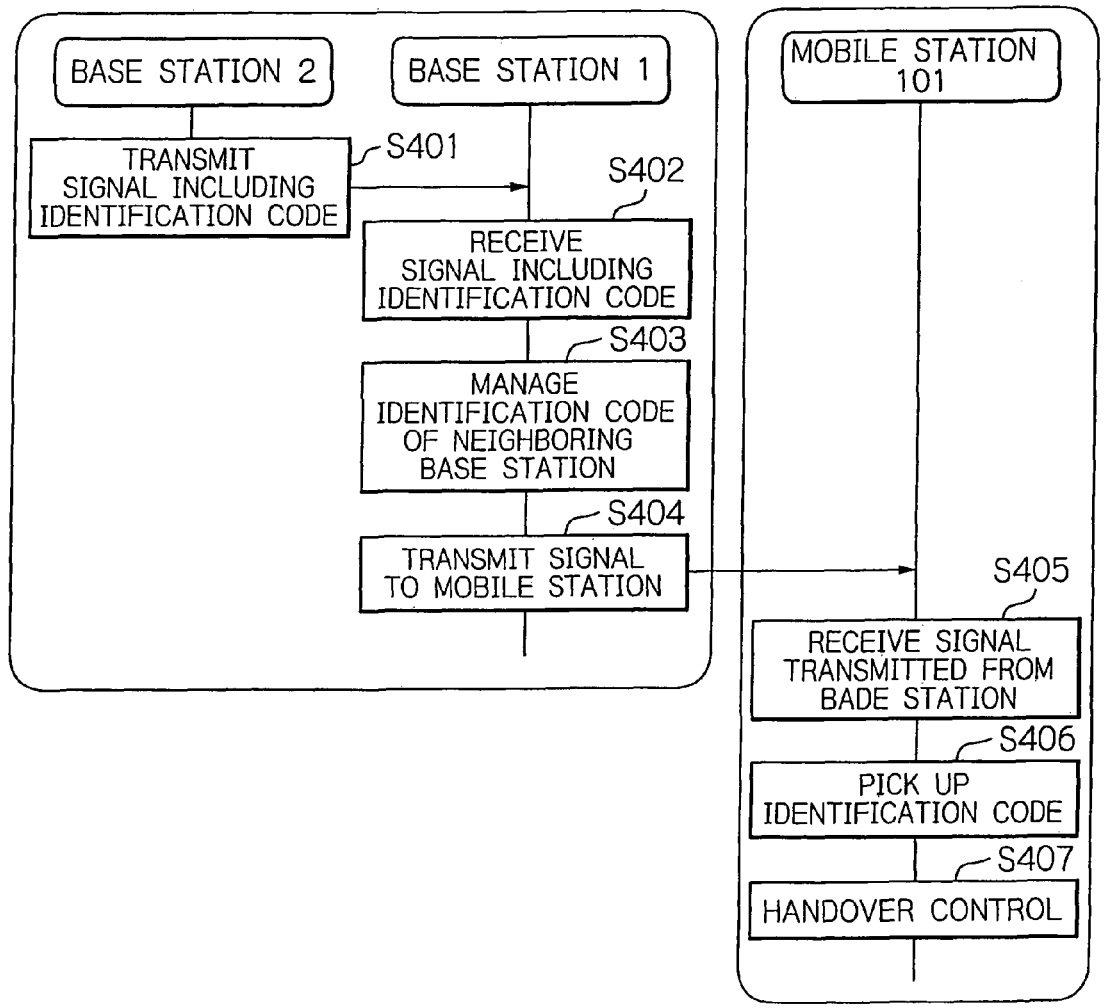
FIG. 4 is a flowchart useful for understanding a communication procedure between the mobile station and the base station shown in FIG. 1.

In order to implement the algorithm stated above, the system may be adapted in such a fashion that the transmitting data generator 205 of the base station 102 incorporates, at step S404 in FIG. 4, the output power information into transmitting data, and at step S406, the received data processor 304 of the mobile station 101 picks up the output power information.

Figure 7:
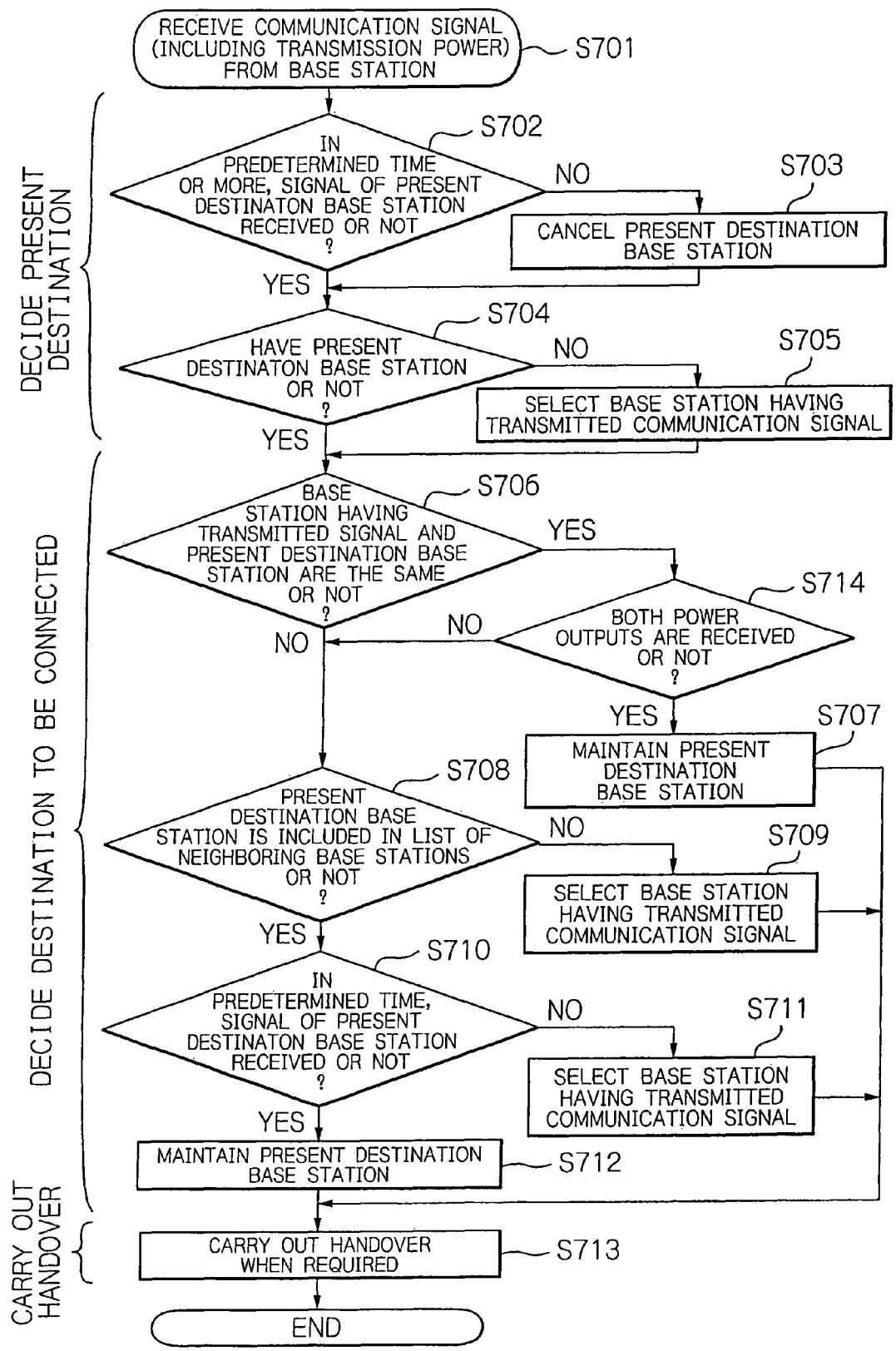
FIG. 7 is a flowchart that shows an algorithm of the handover decision on the basis of the transmitter output information sent from the base station shown in FIG. 1.

Next, reference will be made to FIG. 7, in which steps S702 to S713 are the same as steps S602 to S613 in FIG. 6.

At step S701, having received a wireless communication signal from a base station 102, the handover controller 306 starts its handover control. Simultaneously, it prepares the list of the neighboring base station on the basis of the identification code included in the communication signal before starting. The communication signal includes the output power information of the base station 102 at the time of the signal transmission. Now, assuming that the communication signals with two kinds of output power level, large and small, are transmitted, and therefore, the communication signals include the output power information corresponding to the two kinds of output power level.

At step S714, the handover controller 306 estimates the positional correlation between the base station 102 that has transmitted the communication signal and the mobile station 101 on the basis of the output power information, and then decides whether or not the base station is selected as the destination station on the basis of the positional correlation. For example, when both communication signals having two kinds of output power level have been received, the handover controller 306 decides that the distance between the base station 102 is sufficiently near, and it goes to step S707. When only the signal having large output power level has been received, it goes to step S708 and depends upon the following decisions.

In operation, with reference to FIG. 8, another algorithm of the handover control according to the illustrative embodiment of the invention will be described in which the information of the number of mobile stations that are connected to the base station 102 is used for the handover decision.

In above-described handover control algorithms, the handover decisions are principally performed on the basis of the decision criteria used on the side of the mobile station 101. However, when a lot of mobile stations are already connected to the base station 102, new connection tried by the handover operation of another mobile station might be rejected because the capacity of the base station has become short. If the handover operation is accompanied by such a rejection of connection, it is necessary to repeat the handover operation, so that the object of the present invention to reduce the number of handover operations could not be fully achieved.

In order to overcome that difficulty, at step S404 in FIG. 4, the transmitting data generator 205 of the base station #1 may include information on the number of mobile stations that are connected to the base station #1 itself, and at step S406, the received data processor 304 of the mobile station 101 may pick up the information on the number of connecting mobile stations.

Figure 8:
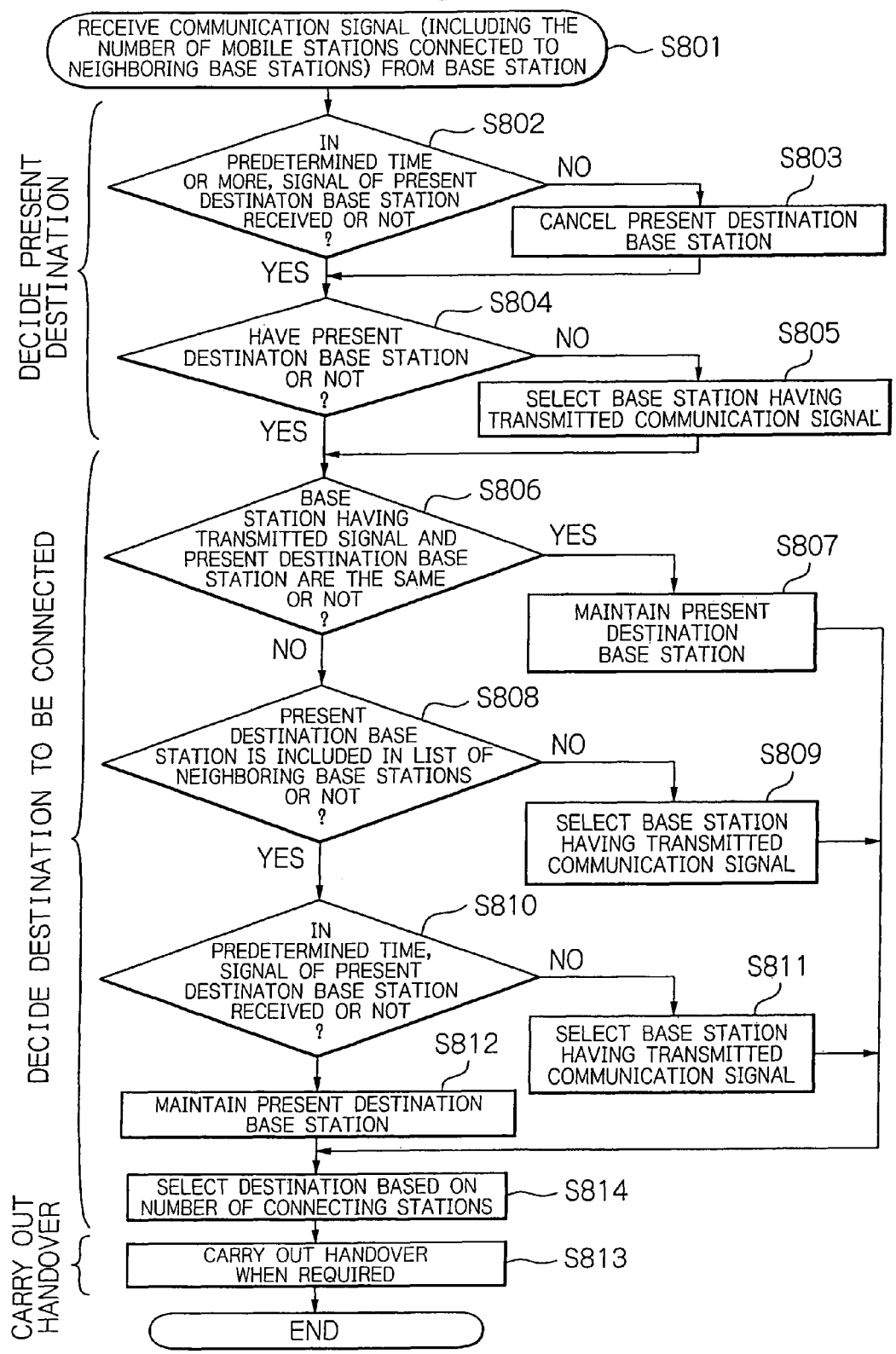
FIG. 8 is a flowchart that shows an algorithm of the handover decision on the basis of the information of the number of mobile stations connected to the base station.

Next, FIG. 8 will be referenced. Steps S802 to S813 are the same as steps S502 to S513 in FIG. 5. In FIG. 8, however, step S814 precedes step S813, for the convenience of description.

At step S801, having received a wireless communication signal from a base station 102, the handover controller 306 starts its handover control. Simultaneously, it prepares the list of neighboring base stations 102 on the basis of an identification code included in the communication signal before starting. The communication signal includes the information of the number of mobile stations that are connected to the base station 102.

At step S814, the handover controller 306 detects the number of base stations connecting to the base station in question that is decided to be selected as a destination decided through the procedure up to step S812. When the number of connecting stations is smaller than the predetermined number, the present base station that is selected as the destination will be selected. Otherwise, the base station that has sent the communication signal at step S801 will be selected.

Further, for example, a modification of step S814 as described below may cause the load to substantially be equalized between the base stations. At step S814, the handover controller 306 detects the number of stations connecting to the base station that is decided to be selected as a destination decided through the procedure up to step S812. When the number of stations that are connected with the base station newly selected is considerably larger than the number of mobile stations that are connected to the present destination base station, the present destination base station will not be changed. When the number of stations that are connected with the base station selected at the time is smaller than the number of mobile stations that are connected to the present destination base station, the base station selected at the time will be finally selected.

In operation, with reference to FIG. 9, another algorithm of the handover control according to the illustrative embodiment of the invention will be described in which the positional information of the base station 102 is used for the handover decision. The position information received from plural base stations permits the mobile station 101 to estimate its own present position. Methods to estimate the position will be described later. In order to implement the algorithm, at step S404 in FIG.4, the transmitting data generator 205 of the base station 102 incorporates position information given in advance of that station 102 into transmitting data, and at step S406, the received data processor 304 of the mobile station 101 extracts the position information.

Figure 9:
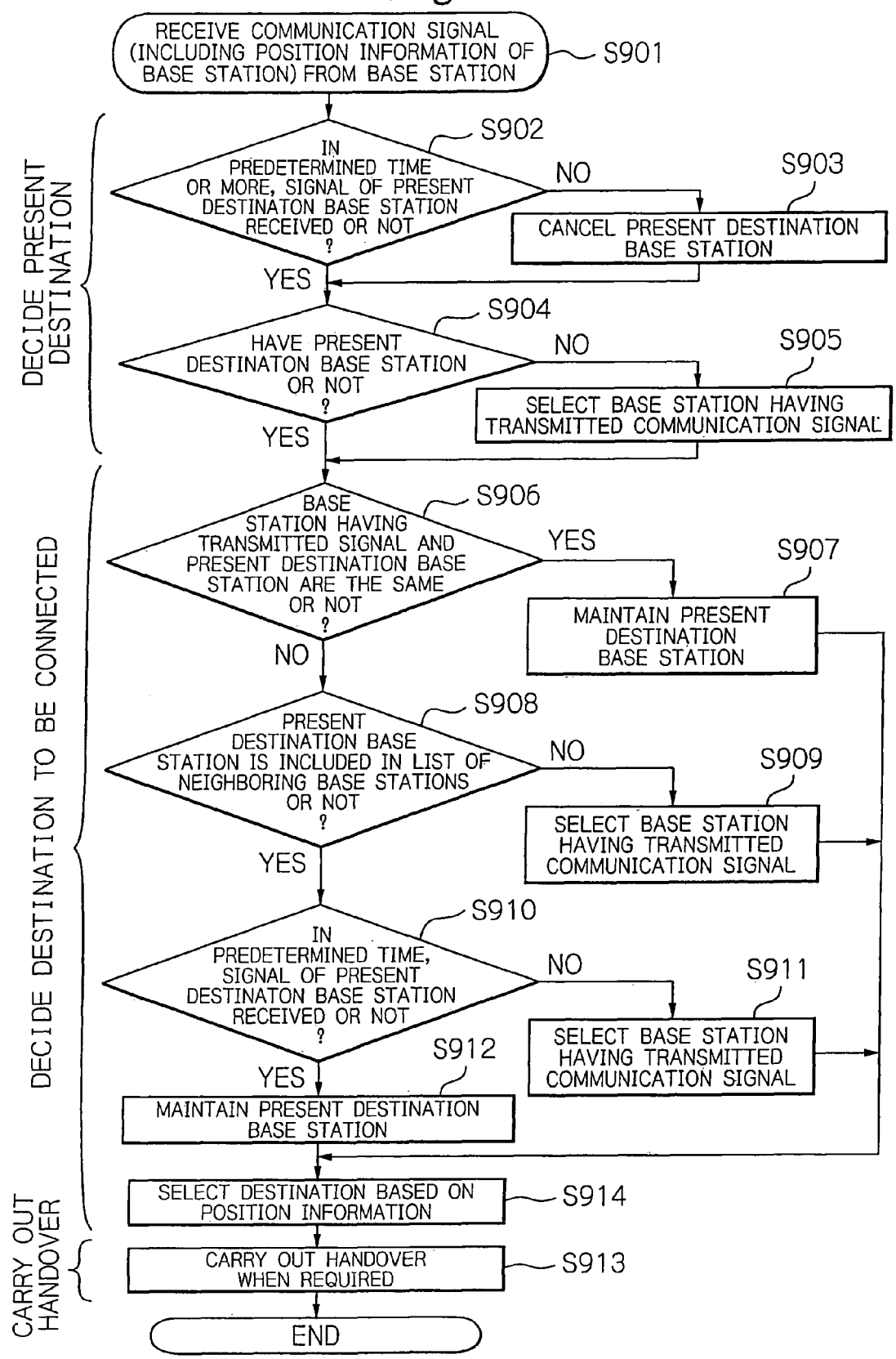
FIG. 9 is a flowchart that shows an algorithm of the handover decision on the basis of the position information of the base station.

Now, FIG. 9 will be referenced. Steps S902 to S913 are the same as steps S502 to S513 in FIG. 5. In FIG. 9, however, step 914 precedes step S913, for the convenience of description.

At step S901, having received a wireless communication signal from a base station 102, the handover controller 306 starts its handover control. Simultaneously, it prepares the list of neighboring base stations 102 on the basis of an identification code included in the communication signal before starting. The communication signal includes the position information of the base station 102.

At step S914, the handover controller 306 detects the position information of the base station that is decided to be selected as a destination decided through the procedure up to step S912 as well as the position information of the present destination base station, and then calculates the distance between the respective base stations 102 and the mobile station 101 in question on the basis of the estimated position of that mobile station 101. When the distance to the base station selected at the time is shorter, that base station that is selected at the time will be selected. When the distance to the present destination base station is shorter, the present destination base station will be maintained.

To methods of estimating the position of the mobile station 101, the following ones may be applicable. In one method, the median point of the positions of the base stations from which signals were received in the past is used as the estimated position of the mobile station 101.

In another method, the positions of the base stations from which signals were received in the past and the average possible propagation distance of a wireless signal are used to calculate the probable range in which the mobile station 101 exists to determine the center of the calculated range as the estimated position of the mobile station.

In still another method, the received data processor 304 is provided with the function to record the time of signal reception, and the positions of the base stations from which signals were received in the past are multiplied by coefficients, inverse proportional to the past time from each signal reception, to thereby obtain the modified median point as the estimated position of the mobile station 101.

As the stored position information of the base stations from which signals were received in the past, use may be made of, for example, the received data stored during a predetermined time in the past or received data stored with a predetermined number of receptions in the past.

Figure 10:
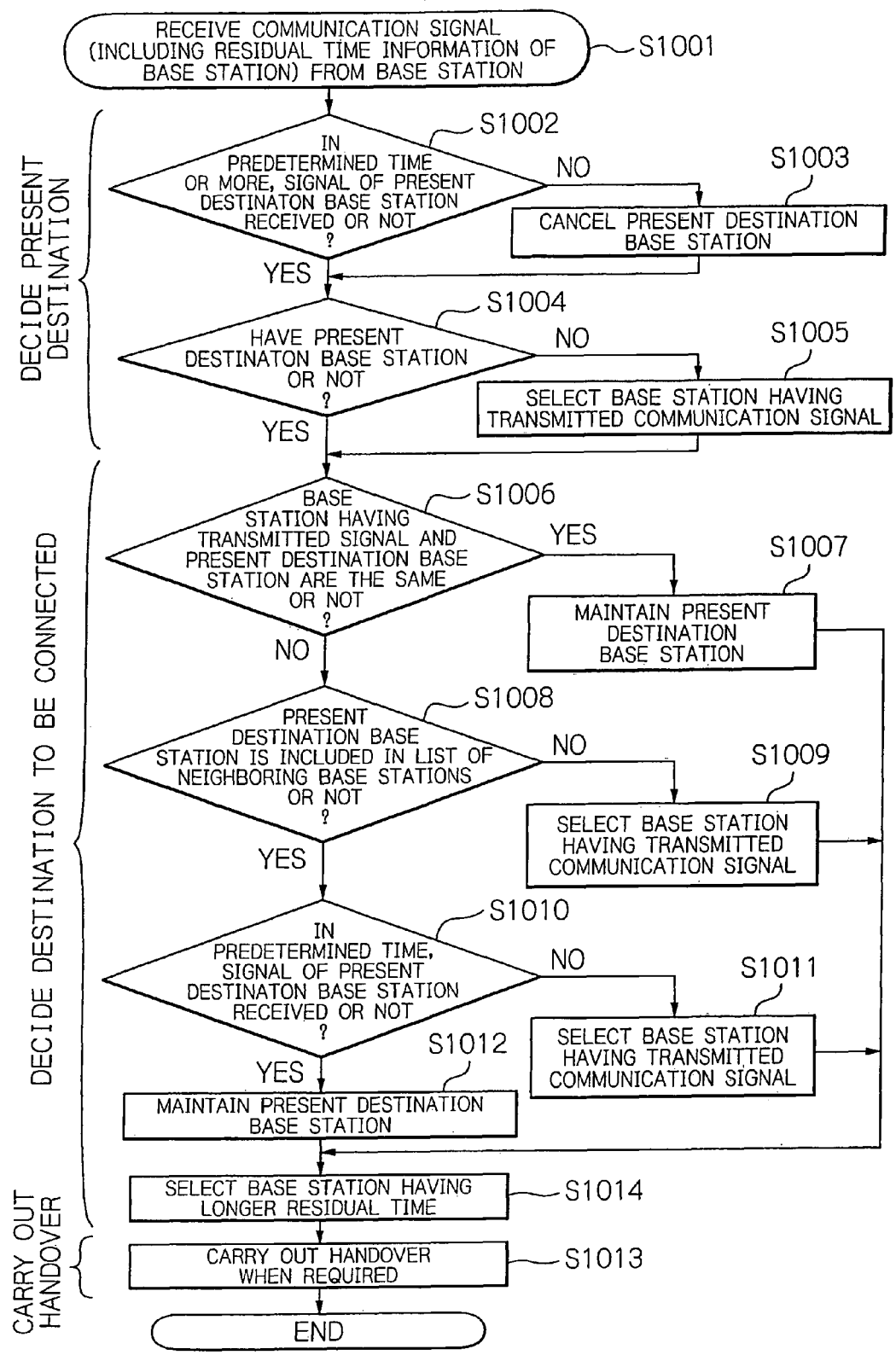
FIG. 10 is a flowchart that shows an algorithm of the handover decision on the basis of the information of the residual time left before the interruption interval of the base station.

In operation, with reference to FIG. 10, another algorithm of the handover control according to the illustrative embodiment of the invention will be described in which the residual time information until the interruption or standby interruption interval of the base station 102 is used for the handover decision. In a wireless sensor network, to make the lifetime of each base station longer, a method is proposed in which the base stations 102 may alternately be shifted into their interruption intervals, i.e. out of operation. However, if a base station 102 went to its interruption interval while it has many mobile stations 101 that are connected therewith, the many mobile stations 101 would be obliged to make their handover operations simultaneously, and such circumstances would not be preferable from the viewpoint of communication loading. In order to avoid such circumstances, it is proposed to incorporate information on a residual period of time until the interruption interval of a base station 102 into a communication signal to be utilized for a handover decision.

In order to implement such an algorithm, at step S404 in FIG. 4, the transmitting data generator 205 of the base station #1 may incorporate residual time information until the interruption interval of the base station 102 in question into transmitting data, and at step S406, the received data processor 304 of the mobile station 101 will extract the residual time information.

Well, reference will be made to FIG. 10, in which steps S1002 to S1013 are the same as steps S502 to S513 in FIG. 5. In FIG. 10, however, step S1014 precedes step S1013, for the convenience of description.

Specifically, at step S1001, having received a wireless communication signal from a base station, the handover controller 306 starts its handover control. Simultaneously, the controller 306 prepares the list of neighboring base stations on the basis of an identification code included in a communication signal before starting. The communication signal includes residual time information until the interruption interval of the base station 102.

At step S1014, the handover controller 306 detects the residual time information until the interruption interval of the base station that is decided to be selected as the destination decided through the procedure up to step S1012, and also detects the residual time information until the interruption interval of the present destination base station. Then, the handover controller 306 selects a base station having information on a longer residual time until its interruption interval.

As described above in FIGS. 5 to 10, these algorithms of the handover control according to the illustrative embodiment of the invention are configured on the basic configuration shown in FIG. 5, with steps S614, S714, S814, S914 and S1014 taken in to account, respectively. It is possible to use these algorithms optionally combined with each other, so that more effective reduction of the number of required handover operations may be achieved. In case of such a combination is used, by considering priority, weighting and procedure properly, a most suitable algorithm may selectively be focused.

For example, when it is needed to change the position of the base station 102 very often, it may be preferable not to use the algorithm shown in FIG. 9, especially the step S914. Alternatively, if it is considered that the load balancing is a more important factor than the residual time information until the interruption interval of the base station, the algorithm may be modified so as to perform the step S814 after the step S1014.

As described above, the illustrative embodiment of the present invention is directed to a handover control method for switching a destination base station carried out at a mobile station in a multi-hop network composed of base stations and mobile stations in which the distances between the base stations are shorter than the distance in which a wireless communication signal is available. The handover method comprises a reception step to receive a communication signal and the information of neighboring base stations transmitted from the base stations, the latter information being used to identify a single or plural base stations existing in the surrounding area of that base station, and a control step to control the handover processing on the basis of the signal and information received at the reception step. Further, the control step comprises a present destination decision step to decide the base station connected with at present, a switching decision step of using the information of neighboring base stations to decide whether or not the destination base station to be connected will be switched over, and a switching step to switch over the destination base station to be connected on the basis of the decision result of the switching decision step. The handover control method thus reduces the number of handover operations, thereby making it possible to reduce control information transmitted between base stations, and also to reduce the amount of wireless communication signals and power consumption of base stations. Further, it is possible to reduce the amount of control information sent from mobile stations and hence power consumption of the mobile stations, so that the hours of operation can be much increased.

The switching decision step comprises a base station identity decision step to decide whether or not the base station that has transmitted a communication signal received at the reception step is the same as the base station that is selected as a present destination by using the information of neighboring base stations. Therefore, when the base station identity decision step decides that both stations are the same, the switching decision step is able to decide that the present destination base station is maintained. Thus, unnecessary handover operation can be suppressed, when the mobile station exists within the range where a wireless signal of the present destination base station is available and no handover operation is required.

Also, when the base station identity decision step decides that both stations are not the same, consecutively the switching decision step decides whether or not the base station that is selected as its present destination is included in the list of the neighboring base stations represented by the information of the neighboring base stations. If the base station selected at present is not included, then the switching decision step decides that the base station that has transmitted a communication signal received at the reception step will be selected as a destination base station. Thus, when the mobile station has moved outside the range where a wireless signal of the present destination base station or its neighboring base stations is available, the decision the mobile station stated above enables such a situation to be recognized and a new base station to be selected.

Further, when the base station identity decision step decides that both stations are the same as each other, the switching decision step measures the reception level of a communication signal received at the reception step. If the reception level is higher than the predetermined reference level, the switching decision step is able to decide that change of the present destination base station is not required. Thus, it is possible to estimate approximately the distance between the base station and the mobile station, and therefore an estimated distance is used as a handover decision criterion to thereby make it possible to further reduce the number or frequency of handover operations.

Further, the switching decision step comprises a first store step of storing the history of measuring a reception level, and a third decision step of deciding whether or not a mobile station is moving in the direction apart from a base station, on the basis of the measurement history of the reception level, to determine a destination base station to be selected on the basis of the decision result. Thus, it is possible to generally know or determine whether a mobile station is approaching to or going away from the respective base stations for helping handover decision.

Further, when the base station identity decision step decides that both stations are the same as each other, the switching decision step measures the communication quality of a communication signal received at the reception step. If the communication quality is higher than the predetermined reference value, the switching decision step is able to decide that change of the present destination base station is not required. Thus, it is possible to estimate approximately the distance between the base station and the mobile station. Thus, the estimated distance is used as a handover decision criterion to make it possible to further reduce the number of handover operations.

Further, the switching decision step comprises a second store step of storing the history of measuring the communication quality, and a forth decision step of deciding whether or not the mobile station is moving in the direction apart from the base station, on the basis of the measurement history of the communication quality, to decide a base station to be selected on the basis of the decision result. It is thus possible to know whether the mobile station is approaching to or going away from the respective base stations for helping handover decision.

Further, the reception step receives plural kinds of the output power information transmitted from a base station, and when the base station identity decision step decides that both stations are the same as each other, then the switching decision step estimates a positional correlation between a base station that has transmitted a communication signal and the mobile station in question on the basis of output power information to decide whether or not the base station is selected as a destination station on the basis of the positional correlation. Thus, for example, when a communication signal having its output power weak cannot be received, it is possible to estimate a distance between the mobile station and the base station far. The estimated distance is used as a handover decision criterion, and it is therefore possible to further reduce the number of handover operations.

Furthermore, when the reception step receives information of the number of mobile stations that are connected to a base station, the switching decision step further comprises a fifth decision step to detect the number of mobile stations that are connected to the base station and decide the base station to be selected depending on whether or not the number is larger than a predetermined value. Thus, it is possible to prevent such circumstances that a new connection tried by the handover operation of a mobile station might be rejected because the capacity of the base station has become short when a lot of mobile stations are already connected to the base station. Moreover, when the number of mobile stations that are connected with a base station newly selected is considerably larger than the number of mobile stations connected to the current destination base station, the current destination base station will not be changed. When the number of mobile stations connected with a base station selected at the time is smaller than the number of mobile stations connected to the current destination base station, the base station selected at the time will be finally selected. Therefore, load may be equalized between base stations.

Moreover, when the reception step receives positional information of a base station and stores a predetermined number of pieces of positional information, the switching decision step further comprises an estimation step to estimate the distance between the mobile station and the base station on the basis of the positional information, and a sixth decision step to decide the base station to be selected as a destination on the basis of the distance. By thus receiving the positional information of plural base stations it is possible to estimate the position of that station in question, so that an estimated position of that station is used as a handover decision criterion, thereby making it possible to further reduce the number of handover operations.

Furthermore, when the reception step receives information on a residual time until the following interruption of a base station, the switching decision step further comprises a first selection step to select the base station having its residual time longer on the basis of the residual time information. Thus, such circumstances can be prevented, which would otherwise be caused by a rapid rise of communication load that occurs when a base station goes to its interruption interval while it has many mobile stations that are connected therewith and the many stations are obliged to make their handover operations simultaneously.

The mobile communication terminal according to the illustrative embodiment of the invention comprises a receiver that carries out the reception step as described above and digitize a received signal, and a handover controller that carries out the control step as described above on the basis of information received and digitized by the receiver. It is therefore possible to carry out the handover control algorithm described above by means of digital processing technology under the software control, for example, on the basis of a communication signal transmitted from a base station.

The base station that transmits a communication signal to a mobile station according to the illustrative embodiment of the invention comprises a receiver that receives the signal transmitted from a mobile station and signals transmitted from neighboring base stations which exist in a surrounding area of the base station in question, a received data processor that picks up the identification information of the neighboring base stations out of the signals transmitted from the neighboring base stations received by the receiver, a neighboring base station manager that stores and manages the identification information picked up by the received data processor, and a transmitter that transmits a communication signal including the identification information of that station in question and the identification information of the neighboring base stations stored and managed by the neighboring base station manager. It is thus possible to transmit a signal including not only an identification code of that station but also the identification codes of the neighboring base stations, and therefore, at the mobile station, it is possible to carry out a handover decision on the basis of the identification codes of the neighboring base stations.

Still further, the transmitter transmits output power information representing the output power level of a communication signal to be transmitted together with the communication signal, and the received data processor picks up the output power information out of signals transmitted from the neighboring base stations. In an application where the base station decides its output power level according to the contents of information to be transmitted, it is thus possible to recognize how large the transmitted output power levels are at a mobile station to use the output power information for assisting handover decision.

Still furthermore, the transmitter transmits information of the number of mobile stations that are connected at present to a base station in question together with a communication signal, and the received data processor picks up the information of the number of mobile stations out of signals transmitted from the neighboring base stations. It is therefore possible to prevent such circumstances which occur when a new connection has been tried by the handover operation of the mobile station and then the connection has been rejected.

Furthermore, since the transmitter transmits position information of the base station of interest together with a communication signal, and the received data processor picks up the position information out of the signals transmitted from the neighboring base stations. It is therefore possible to use the position information for helping handover decision carried out by the mobile station.

Further, the transmitter transmits information on a residual period of time until the interruption interval of the base station in question together with a communication signal, and the received data processor extracts the residual time information out of the signals transmitted from the neighboring base stations. It is therefore possible to use the residual time information for helping handover decision carried out by the mobile station.

According to the second, or alternative, embodiment of the invention, a mobile communication terminal corresponding to the mobile station 101 shown in FIG. 1 is provided with means to detect its own movement, and the output of the means is used for handover decision. The schematic configuration of the multi-hop wireless network according to the alternative embodiment is the same as shown in FIG. 1. The base station is also the same as shown in FIG. 2.

Figure 11:
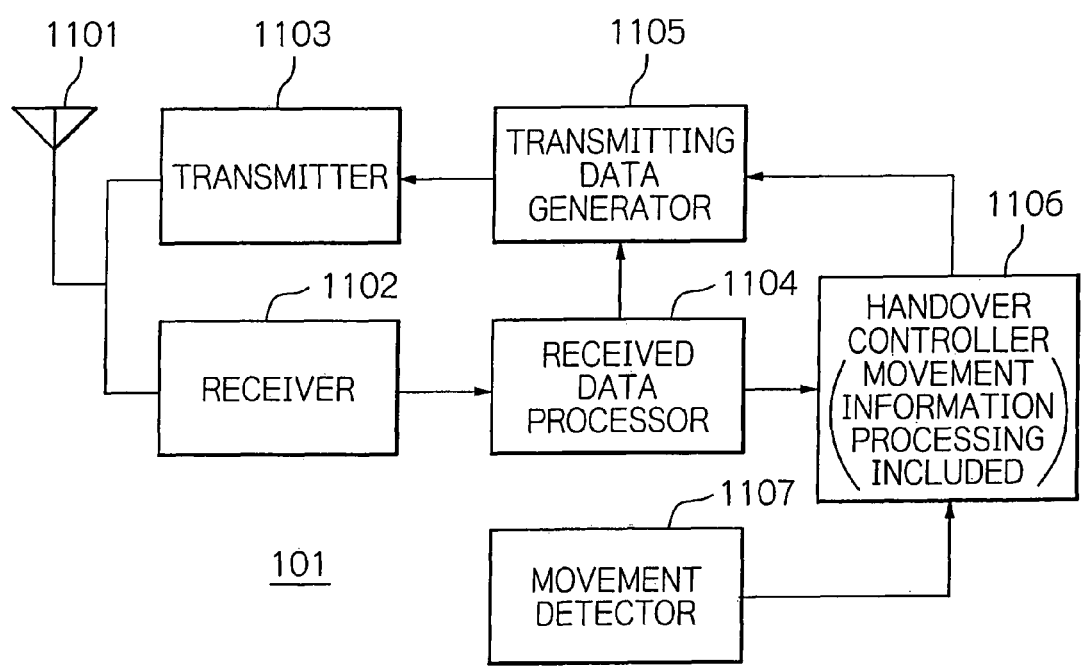
FIG. 11 shows a schematic block diagram of a mobile station according to the second embodiment of the present invention.

With reference to FIG. 11, the mobile station 101 according to the alternative embodiment of the present invention will now be described in detail. The mobile station 101 is composed of an antenna 1101, a receiver 1102, a transmitter 1103, a received data processor 1104, a transmitting data generator 1105, a handover controller 1106 and a movement detector 1107, which are interconnected as depicted. The functions of the constituent circuits 1101 through 1105 may be the same as the corresponding circuits 301 through 305 shown in FIG. 3. The movement detector 1107 is adapted to measure the movement of the mobile station to produce information such as moving speed, whether to move and moving direction, and supplies the information to the handover controller 1106. The operation of the handover controller 1106 will be described later on with reference to FIG. 12.

Figure 12:
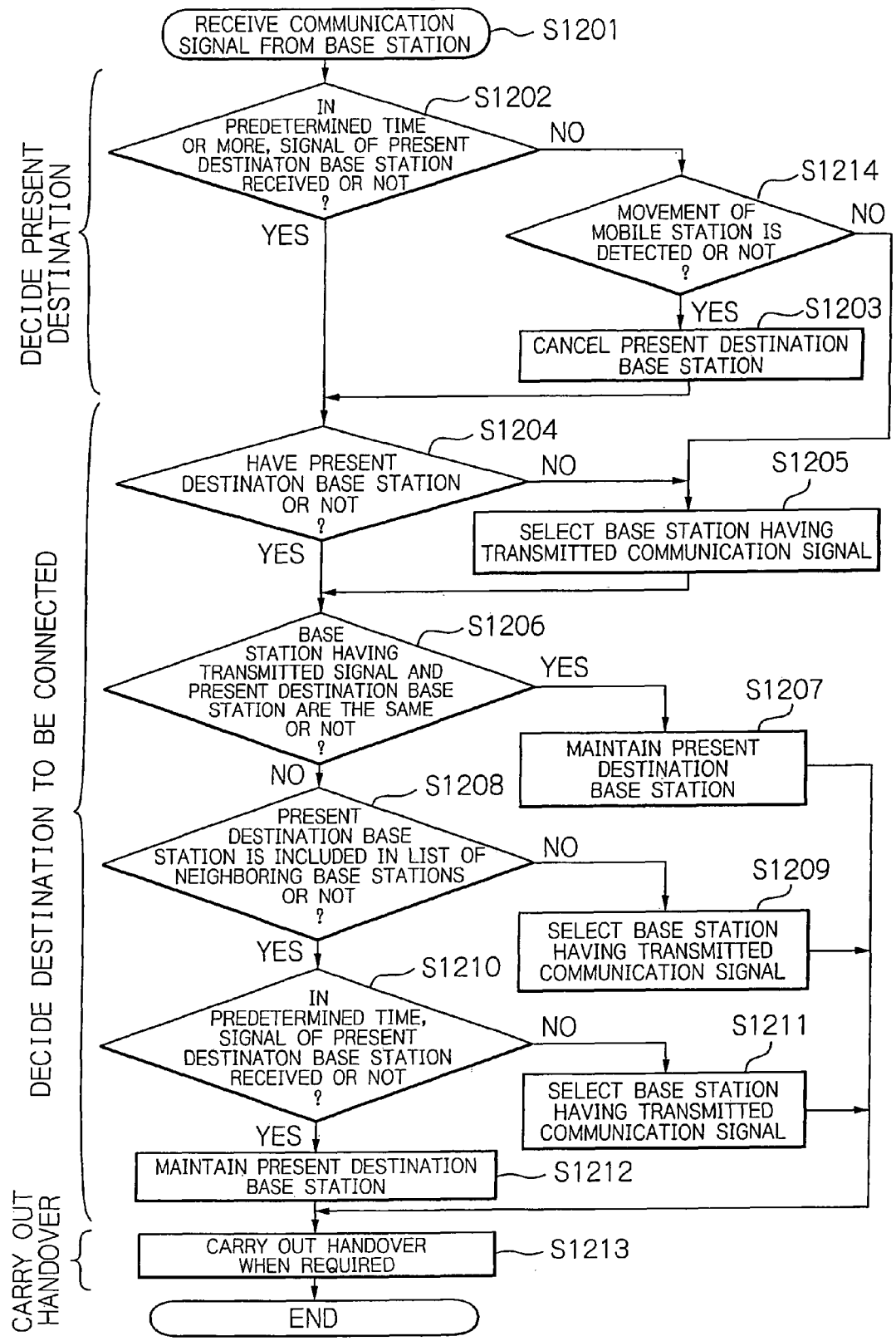
FIG. 12 is a flowchart that shows an algorithm for controlling the handover by the handover controller, shown in FIG. 11, according to the second embodiment.

In operation, with reference to FIG. 12, description will be made on an algorithm of the handover control carried out by the handover controller 1106 according to the alternative embodiment. The procedures from steps S1201 to S1213 are the same as steps S501 to S513 shown in FIG. 5. However, when it is determined at step S1202 that no signal has been received during than a predetermined period of time or more, a new step S1214 is carried out prior to step S1203.

At step S1214, the handover controller 1106 is responsive to the output of the movement detector 1107 to detect how the mobile station 101 itself moves. When it detects that the mobile station 101 is moving, it goes to step S1203, and when failing to detect moving, it goes to step S1205.

As described above, step S1214 is added in which the movement condition is determined to thereby accomplish the handover decision with the movement condition of the mobile station 101 taken into account, thus making it possible to reduce unnecessary handover operation under the circumstances in which the mobile station 101 moves and stops so often.

In the alternative embodiment, it is also possible to use together the algorithms shown in FIGS. 5 to 10 described in connection with the first embodiment. The receiver 1102 of the mobile station 101 may be provided, as an alternative configuration, with the function to measure the information, such as reception level and communication quality etc., by which the distance between the mobile station 101 and the base station 102 is able to be estimated, to output the obtained information to the handover controller 1106 via the received data processor 1103.

Information obtained by the movement detector 1107 may be combined with information obtained from measurement by the receiver 1102, so as to add step S1215 after step S1212 as will be described below. At step S1215, when the number of mobile stations 101 that are connected with a base station 102 newly selected is considerably larger than the number of mobile stations that are connected to the present destination base station, the present destination base station will be maintained. When the number of mobile stations that are connected with the base station selected at the time is smaller than the number of mobile stations that are connected to the present destination base station, and also when no movement of the mobile station 101 is detected during the predetermined time or more, then, the communication quality of the base station selected is compared with that of the present destination base station so as to finally select a base station supposed as having better communication condition or shorter distance from the mobile station in question.

As described above, in the alternative embodiment, the present destination decision step comprises a seventh decision step to decide whether or not a communication signal has been received from a base station selected as a destination at present during a predetermined time or more, a movement detection step to detect movement condition of the mobile station after the seventh decision step has decided that the signal has not been received during the predetermined time or more, and an eighth decision step to decide the present destination base station on the basis of the result of the movement detection step with the handover decision taken into account of the movement condition. Thus, it is possible to reduce unnecessary handover operation under the circumstances in which the mobile station moves and stops so frequently.

Further, at the present destination decision step, the base station that has transmitted a communication signal received at the reception step is selected as a present destination base station when the moving of the mobile station is not detected. When the mobile station has not moved, it is determined that the base station from which a communication signal has been transmitted should be selected as a destination, thus making it possible to reduce unnecessary handover operation.

The mobile communication terminal according to the alternative embodiment of the invention comprises a movement detector that detects the moving speed of the mobile communication terminal itself and whether or not that terminal has moves, and a receiver that carries out the reception step as described above a handover controller that carries out the control step as described above. A handover decision can be done with the movement condition taken into account, thus, being able to reduce unnecessary handover operation under the circumstances in which the mobile station moves and stops so frequently.

According to the third, further alternative, embodiment of the invention, a mobile communication terminal corresponding to the mobile station 101 shown in FIG. 1 is newly provided with means to detect its own position, and the output of the means is used for a handover decision. The schematic configuration of the multi-hop wireless network according to the third embodiment is the same as shown in FIG. 1. The configuration of the base station is also the same as shown in FIG. 2. However, the transmitting data generator 205 is configured to output transmitting data including information on the position of that own terminal given in advance. In other words, a communication signal transmitted from a base station includes position information of a base station as well as the neighboring base stations.

Figure 13:
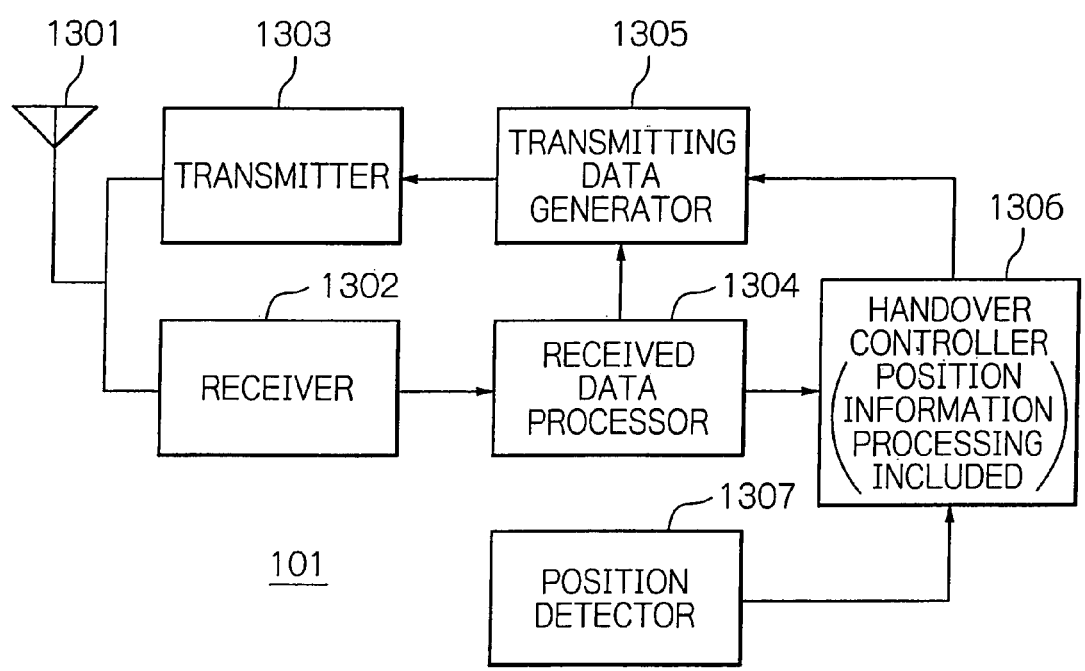
FIG. 13 shows a schematic block diagram of the mobile station according to the third embodiment of the present invention.

With reference to FIG. 13, the mobile station 101 according to the third embodiment of the present invention will now be described in detail. The mobile station 101 is composed of an antenna 1301, a receiver 1302, a transmitter 1303, a received data processor 1304, a transmitting data generator 1305, a handover controller 1306 and a position detector 1307, which are interconnected as illustrated. The functions of the components 1301 through 1305 are the same as corresponding ones 301 through 305 shown in FIG. 3. The position detector 1307 functions as detecting the position of the mobile station 101 by means of a positioning system such as the GPS to develop its output to the handover controller 1306. The operation of the handover controller 1306 will be described in the following with reference to FIGS. 14 and 15.

Figure 14:
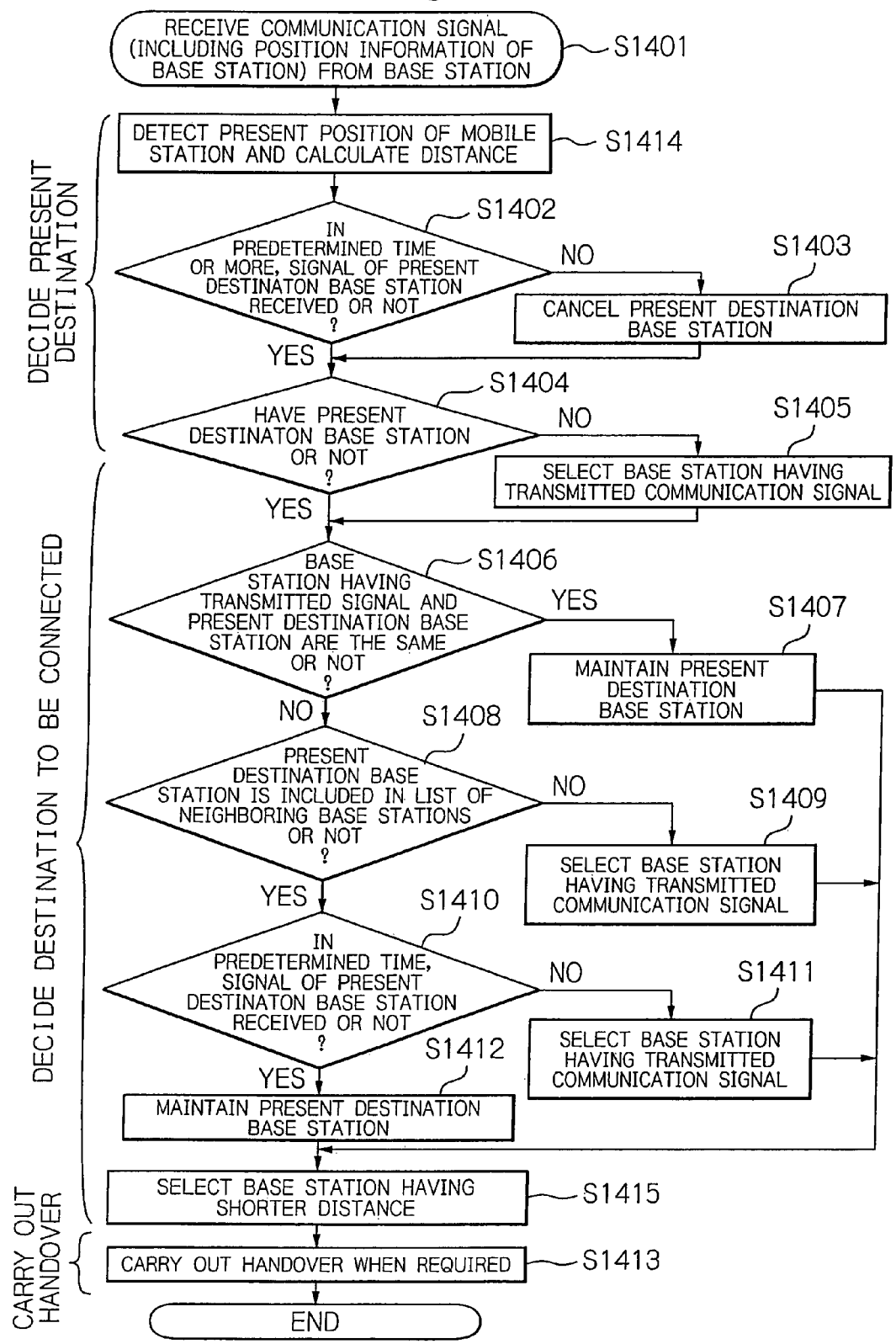
FIG. 14 is a flowchart that shows an algorithm for controlling the handover by the handover controller, shown in FIG. 13, according to the third embodiment.

In operation, with reference to FIG. 14, an algorithm of the handover control will be described which is carried out by the handover controller 1306 according to the third embodiment. The procedures from steps S1402 to S1413 are the same as steps S502 to S513 shown in FIG. 5. However, it is different from FIG. 5 that step S1414 is carried out before the step S1402, and step S1415 is carried out before the step S1413. In FIG. 14, step S1414 precedes step S1402 and step S1415 precedes step S1413, for the convenience of description.

At step S1401, having received a wireless communication signal from a base station, the handover controller 306 starts its handover control. Simultaneously, the controller 306 prepares the list of neighboring base stations on the basis of an identification code included in a communication signal before starting. With this embodiment also, the communication signal includes position information of the base station 102.

At step S1414, the handover controller 1306 detects the present position of the mobile station 101 itself on the basis of the output of the position detector 1307. Next, it calculates the distance from the present destination base station 102 to the mobile station 101 itself and also the distance from the base station 102 selected as a destination on the basis of the decisions made beforehand to the mobile station 101 itself.

Further, at step S1415, the distance from the present destination base station 102 to the mobile station 101 itself is compared with the distance from a base station selected as a destination on the basis of the decisions made beforehand to the mobile station 101 itself, and the handover controller 1306 thereby selects a base station 102 having shorter distance.

In operation, with reference to FIG. 15, another algorithm of the handover control according to the third embodiment will be described in which the distance to the base station 102 is used for the handover decision. The procedures from steps S1501 to S1514 are the same as from steps S1401 to S1414 shown in FIG. 14. It is however different from FIG. 14 that step S1515 is carried out before the step S1507, when the base station that has transmitted a communication signal is identified the same as the present destination base station at step S1506.

At step S1515, the handover controller 1306 decides whether or not the distance calculated at step S1514 is larger than the predetermined value. When the distance is larger than the predetermined value, it goes to step S1507, otherwise to step S1508.

It is also possible to use the algorithms performed in the illustrative embodiments described earlier together with the algorithms shown in FIGS. 14 and 15 described in the third embodiment.

The handover controller of the mobile station 101 according to the first, second and third embodiments may be implemented by a microcomputer. In such a case, the handover control algorithm may be implemented in the form of software installed in and controlling the microcomputer.

As described above, in the third embodiment, position information of a base station that has transmitted a communication signal is received at the reception step, and the present destination decision step comprises a position detection step to detect the present position of a mobile station, a first distance calculating step to calculate the distance between the mobile station and the present destination base station on the basis of the result of the position detection step, and a second distance calculating step to calculate the distance between the mobile station and the base station selected as a destination by the switching decision step on the basis of the result of the position detection step, and further, the switching decision step comprises a second selection step to select a base station having its distance shorter from the mobile station as the destination base station on the basis of the calculated results of the first and second distance calculating steps. Thus, it is possible to further reduce the number of handover operations by using more accurate positional information than estimated positional information of a mobile station.

When the base stations are identified as the same at the base station identity decision step, if the distance between the mobile station and the base station that has transmitted a communication signal received at the reception step is larger than a predetermined value, the switching decision step decides that the present destination base station will be continuously selected. Thus, it is possible to further reduce the number of handover operations by using more accurate position information than estimated positional information of the mobile station.

When the base stations are identified as the same at the base station identity decision step, the switching decision step decides whether or not the mobile station is moving in the direction apart from the base station, and on the basis of the decision result the base station to be selected as the destination is decided. It is thus possible to know roughly whether the mobile station is approaching to or going away from the respective base stations for helping handover decision.

The mobile communication terminal according to the third embodiment comprises a position detector that detects the present position of the mobile communication terminal itself, the receiver carries out the reception step as described above, and the handover controller carries out the control step as described above. More accurate position information obtained at the position detector is used so as to make it possible to further reduce the number of handover operations.

In the form of handover control program that has the handover controller carrying out the operation of the control step described above, the algorithms described above may be implemented as software.

The entire disclosure of Japanese patent application No. 2006-139942 filed on May 19, 2006, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A handover control method carried out at a mobile station for switching a destination base station in a multi-hop network including base stations and mobile terminals wherein neighboring base stations are arranged at a shorter interval than a range in which a wireless communication signal is available to enable wireless communication to take place between the neighboring base stations, said handover method comprising:
    a reception step of receiving at the mobile station the communication signal transmitted from a prospective base station including identification information of the prospective base station and information of neighboring base stations existing in a surrounding area of the prospective base station;
    a listing step of making a list of the neighboring base stations represented by the information of neighboring base stations; and
    a control step of controlling handover processing on a basis of the identification information and the information of neighboring base stations received at said reception step;
    said control step comprising:
    a present destination decision step of deciding a current destination base station connected with at present;
    a switching decision step of using the information of the neighboring base stations to decide whether or not the destination base station is to be switched over; and
    a switching step of switching over the destination base station on the basis of the decision result of said switching decision step
    said switching decision step comprising:
    a base station identity decision step of using the communication signal to decide whether or not the prospective base station that has transmitted the communication signal received at said reception step is the same as the current destination base station,
    wherein, when said base station identity decision step decides that the prospective base station that has transmitted the communication signal received at said reception step is not the same as the current destination base station, consecutively said switching decision step decides whether or not the current destination base station is included in the list,
    if the current destination base station is not included in the list, then said switching decision step deciding that the destination base station is to be switched over from the current destination base station to the prospective base station that has transmitted the communication signal received at said reception step.

2. The method in accordance with claim 1, wherein when said base station identity decision step decides that the prospective base station that has transmitted the communication signal received at said reception step is the same as the current destination base station, said switching decision step deciding that change of the destination base station is not required.

3. The method in accordance with claim 1, wherein, when said base station identity decision step decides that both stations are the same as each other, said switching decision step measures a reception level of the communication signal received at said reception step,
if the reception level is higher than a predetermined reference level, said switching decision step deciding that change of the current destination base station is not required.

4. The method in accordance with claim 3, wherein said switching decision step further comprises:
    a first store step of storing a measurement history of the reception level; and
    a third decision step of deciding whether or not the mobile station is moving in a direction apart from the base station, on the basis of the measurement history of the reception level, and deciding the destination base station to be selected on the basis of the decision result.

5. The method in accordance with claim 1, wherein, when said base station identity decision step decides that both stations are the same as each other, said switching decision step measures a communication quality of the communication signal received at said reception step,
if the communication quality is higher than the predetermined reference level, said switching decision step deciding that change of the current destination base station is not required.

6. The method in accordance with claim 5, wherein said switching decision step further comprises:
    a second store step of storing the measurement history of the communication quality; and
    a forth decision step of deciding whether or not the mobile station is moving in the direction apart from the base station, on the basis of the measurement history of the communication quality, and deciding the base station to be selected on the basis of the decision result.

7. The method in accordance with claim 1, wherein said reception step receives plural kinds of output power information transmitted from the base station,
when said base station identity decision step decides that both stations are the same as each other, then said switching decision step estimates a positional correlation between the base station that has transmitted the communication signal and the mobile station on the basis of the output power information, and deciding whether the base station is to be selected as the destination station on the basis of the positional correlation.

8. The method in accordance with claim 1, wherein said reception step receives information of a number of mobile stations that are connected to the base station,
said switching decision step further comprising a fifth decision step of detecting the number of mobile stations that are connected to the base station and deciding the destination base station to be selected, depending on whether or not the number is larger than a predetermined value.

9. The method in accordance with claim 1, wherein said reception step receives position information of the base station, and stores a predetermined number of pieces of position information, and said switching decision step further comprising:

an estimation step of estimating the distance between the mobile station and the base station on the basis of the position information; and a sixth decision step of deciding the base station to be selected as the destination on the basis of the distance.

10. The method in accordance with claim 1, wherein said reception step receives information of a residual time until an interruption interval of the base station, said switching decision step further comprising a first selection step of selecting the base station having a longer residual time on the basis of the residual time information.

11. The method in accordance with claim 1, wherein said current destination decision step comprises:

a seventh decision step of deciding whether or not the communication signal from the base station selected as the destination at present has been received in a predetermined time;

a movement detection step of detecting a movement condition of the mobile station after said seventh decision step has decides that said signal has not been received in a predetermined time; and an eighth decision step of deciding the current destination base station on the basis of a result of said movement detection step.

12. The method in accordance with claim 11, wherein at said current destination decision step, the base station that has transmitted the communication signal received at said reception step is selected as a current destination base station when the moving of the mobile station is not detected.

13. The method in accordance with claim 1, wherein said reception step receives position information of the base station, said current destination decision step further comprising:

a position detection step of detecting the current position of the mobile station;

a first distance calculating step of calculating the distance between the mobile station and the current destination base station on the basis of the result of said position detection step; and a second distance calculating step of calculating the distance between the mobile station and the base station selected as the destination by said switching decision step on the basis of the result of said position detection step;

said switching decision step further comprising a second selection step of selecting the base station having a shorter distance from the mobile station as the destination base station on the basis of a calculated result of said first distance calculating step and said second distance calculating step.

14. The method in accordance with claim 13, wherein when the base stations are identified as the same at said base station identity decision step, and if the distance between the mobile station and the base station that has transmitted the communication signal received at said reception step is larger than a predetermined value, said switching decision step decides that the current destination base station is to be continuously selected.

15. The method in accordance with claim 14, wherein when the base stations are identified as the same at said base station identity decision step, said switching decision step decides whether or not the mobile station is moving in the direction apart from the base station, and on the basis of the decision result, the base station to be selected as the destination is decided.

16. A mobile communication terminal forming a wireless multi-hop network station together with base stations wherein neighboring base stations are arranged at a shorter interval than a distance in which a wireless communication signal is available to enable wireless communication between the neighboring base stations, comprising:

a receiver for receiving at the mobile station the communication signal transmitted from a prospective base station including as data identification information of the prospective base station and information of neighboring base stations existing in a surrounding area of the prospective base station, and then digitizing the received data; and a handover controller for carrying out a control step of controlling handover processing on a basis of the digitized data corresponding to the identification information and the information of neighboring base stations received at the reception step and making a list of the neighboring base stations represented by the information of neighboring base stations;

said control step comprising:

a present destination decision step of deciding a current destination base station connected with at present;

a switching decision step of using the information of the neighboring base stations to decide whether or not the destination base station to be connected is to be switched over; and a switching step of switching over the destination base station on the basis of the decision result of said switching decision step;

said switching decision step comprising:

a base station identity decision step of using the communication signal to decide whether or not the prospective base station that has transmitted the communication signal received at said reception step is the same as the current destination base station, wherein, when said base station identity decision step decides that the prospective base station that has transmitted the communication signal received at said reception step is not the same as the current destination base station, consecutively said switching decision step decides whether or not the current destination base station is included in the list, if the current destination base station is not included in the list, then said switching decision step deciding that the destination base station is to be switched over from the current destination base station to the prospective base station that has transmitted the communication signal received at said reception step.

17. The mobile communication terminal in accordance with claim 16, further comprising a movement detector for detecting a moving speed of said mobile communication terminal and whether or not said mobile communication terminal is moving.

18. The mobile communication terminal in accordance with claim 16, further comprising a position detector for detecting a current position of said mobile communication terminal.

19. A base station for transmitting a communication signal to a mobile communication terminal forming a multi-hop wireless network station together with mobile communication terminals wherein neighboring base stations are arranged at a shorter interval than a range in which a wireless communication signal is available to enable wireless communication between the neighboring base stations, comprising:
- a receiver for receiving a signal transmitted from the mobile communication terminal and signals transmitted from the neighboring base stations which exist in a surrounding area of the base station;
- a received data processor for picking up identification information of said neighboring base stations out of the signals transmitted from said neighboring base stations received by said receiver;
- a neighboring base station manager for storing and managing the identification information of said neighboring base stations picked up by said received data processor; and
- a transmitter for transmitting the communication signal including the identification information of said base station and the identification information of the neighboring base stations stored and managed by said neighboring base station manager,
- wherein said transmitter transmits information of a residual time until an interruption interval of said base station together with the communication signal, said received data processor picking up the residual time information out of the signals transmitted from the neighboring base stations.

20. The base station in accordance with claim 19, wherein said transmitter transmits output power information representing an output power level of the communication signal to be transmitted together with the communication signal,
said received data processor picking up the output power information out of the signals transmitted from the neighboring base stations.

21. The base station in accordance with claim 19, wherein said transmitter transmits information of a number of mobile stations that are connected at present to said base station together with the communication signal,
said received data processor picking up the information of the number of mobile stations out of the signals transmitted from the neighboring base stations.

22. The base station in accordance with claim 19, wherein said transmitter transmits position information of said base station together with the communication signal,
said received data processor picking up the position information out of the signals transmitted from the neighboring base stations.

23. The base station in accordance with claim 19, wherein said transmitter transmits information of a residual time until a interruption interval of said base station together with the communication signal,
said received data processor picking up the residual time information out of the signals transmitted from the neighboring base stations.

24. A non-transitory computer-readable storage medium with an executable handover control program stored thereon for use in a handover controller in a mobile communication terminal forming a multi-hop wireless network station together with base stations wherein neighboring base stations are arranged at a shorter interval than a distance in which a wireless communication signal is available to enable wireless communication between the neighboring base stations, said program comprising instructions to be executed by a microprocessor to perform the following functions:
- a control function, to be performed in the handover controller, of controlling handover processing on a basis of data received from a prospective base station including identification information of the prospective base station and information of neighboring base stations existing in a surrounding area of the prospective base station and making a list of the neighboring base stations represented by the information of neighboring base stations;
- said control function comprising:
- a present destination decision function of deciding a current destination base station connected with at present;
- a second decision function of using the information of the neighboring base stations to decide whether or not the destination base station is to be switched over; and
- a switching function of switching over the destination base station on the basis of the decision result of said second decision function;
- said second decision function comprising:
- a base station identity decision function of using the communication signal to decide whether or not the prospective base station that has transmitted the data is the same as the current destination base station, wherein,
- when said base station identity decision function decides that the prospective base station that has transmitted the data is not the same as the current destination base station, consecutively said second decision function decides whether or not the current destination base station is included in the list,
- if the current destination base station is not included in the list, then said second decision function deciding that the destination base station is to be switched over from the current destination base station to the prospective base station that has transmitted the data.

* * * * *

UNITED STATES PATENT AND TRADEMARK OFFICE
CERTIFICATE OF CORRECTION

PATENT NO.         : 8,432,928 B2
APPLICATION NO.    : 11/798897
DATED              : April 30, 2013
INVENTOR(S)        : Kentarou Yanagihara It is certified that error appears in the above-identified patent and that said Letters Patent is hereby corrected as shown below:

Title Page:

Item (75), should read:

Item (75) Inventor: Kentarou Yanagihara, Hyogo (JP)

Signed and Sealed this
Eighteenth Day of June, 2013

Teresa Stanek Rea
*Acting Director of the United States Patent and Trademark Office*